United States Patent [19]

Gattys

[11] 4,271,034

[45] Jun. 2, 1981

[54] PROCESS OF DENITRATION OF HIGHLY RADIO-ACTIVE WASTE SOLUTIONS

[75] Inventor: Franz-Josef Gattys, Neu-Isenburg, Fed. Rep. of Germany

[73] Assignee: F. J. Gattys Ingenieurbüro, Neu-Isenburg, Fed. Rep. of Germany

[21] Appl. No.: 13,296

[22] Filed: Feb. 21, 1979

[30] Foreign Application Priority Data

Feb. 21, 1978 [DE] Fed. Rep. of Germany ....... 2807324
Jan. 8, 1979 [DE] Fed. Rep. of Germany ....... 2900478

[51] Int. Cl.$^3$ .............................................. G21F 9/06
[52] U.S. Cl. ............................................ 252/301.1 W
[58] Field of Search ................................ 252/301.1 W

[56] References Cited

U.S. PATENT DOCUMENTS

| 3,862,296 | 1/1975 | Dotson et al. | 252/301.1 W |
| 3,962,114 | 6/1976 | Berreth | 252/301.1 W |

FOREIGN PATENT DOCUMENTS 2125915  2/1972  Fed. Rep. of Germany.

*Primary Examiner*—Deborah L. Kyle
*Attorney, Agent, or Firm*—Toren, McGeady and Stanger

[57] ABSTRACT

A method for the denitration of radioactive waste solutions wherein the nitrates in the solution are decomposed by the use of reducing agents in the form of powders or gaseous reactants. Additional advantages with respect to yield are obtained by conducting the discharge from the reaction through an irrigation path and then through a reflux condenser.

5 Claims, No Drawings

PROCESS OF DENITRATION OF HIGHLY RADIO-ACTIVE WASTE SOLUTIONS

BACKGROUND OF THE INVENTION

1. Field of the Invention

The invention relates to methods for the treatment of radioactive waste products to facilitate their storage and disposal.

2. Description of the Prior Art

In nuclear energy production, the waste products generated in the reactor fuel elements are fission products which, for the most part, are radioactive. To a predominant degree, they belong to the medium heavy elements having atomic numbers of between 30 (zinc) and 64 (gadolinium). As long as the fuel elements are undamaged, these fission products remain enclosed in the sheathing tubes of the fuel elements. However, when the fuel elements which have been exposed to radiation are decomposed and dissolved in the head end of a reprocessing plant, the fission products are released.

Some fission products, such as, for example, krypton and iodine, occur predominantly in the gaseous state and must be removed from the waste gas by means of special devices. However, most fission products are solid and, together with the uranium and the transuraniums generated in the reactor in addition to the fission products, they are dissolved with hot nitric acid during the treatment of the burnt nuclear fuel. After the separation of uranium and plutonium by means of a liquid-liquid extraction, e.g., using as the extraction agent, tributyl-n-phosphate according to the Purex method, the residual aqueous nitrate phase contains practically all of the fission products and the remaining transuranium. In addition, the aqueous solution contains corrosion products and process chemicals from reprocessing.

The amount of waste solution obtained for each kWh of generated electric energy is about 0.004 ml. At first, the waste solutions are stored in steel tanks in the reprocessing plant. Due to their high concentration of activity which, at the beginning, is several thousand curie per liter, they represent a significant potential danger to the biosphere and, therefore, must be carefully isolated. Because of the large amounts of waste solutions generated, in the Federal Republic of Germany, it is projected that there will be an annual generation of about 1560 m$^3$ by the year 2000, the storage of the highly radioactive wastes in the form of solutions in tanks is not a satisfactory solution of the problem.

For this reason, it is desired to transform the highly radioactive wastes into solids. Solids require less space, they are significantly simpler to handle and store than liquids, and, moreover, they are suited for long-term storage.

However, a solidified product must meet a number of minimum requirements, the most important being:

(a) chemical stability and low solubility in water, (b) mechanical stability, i.e., the ability to maintain as compact a block shape as possible with a small surface in order to impair dispersion, (c) good thermal conductivity in order to ensure the removal of the heat from decay and to prevent the build up of high temperatures in the products.

The simplest method of solidification resides in evaporating the waste solution until a solid residue is obtained and decomposing the nitrates by heating to several hundred degrees celsius. This method produces a calcinate which consists predominantly of oxides. However, this calcinate does not meet the three minimum requirements mentioned above.

Therefore, it has been suggested to evaporate the highly radioactive waste solutions, melt the residue and use suitable additives to form glass-like substances. Especially suited as vitrification agents are the oxides of the elements silicon, phosphorus and boron which form a glass network. The combination of silicon dioxide and boron trioxide is usually called borosilicate glass. Phosphate glass is obtained when phosphorus pentoxide is used.

The chemical problems which arise in the glass production are the difficulty of obtaining a homogenous glass with a content of oxides of fission products as high as possible and the corrosion of the melting vessel. As expected, glasses having a high absorptive power for the oxides of fission products, also have a highly corrosive melt. For example, phosphate glass has a high absorptive power and can absorb 30 to 35% by weight of oxides of fission products. In borosilicate glass, the absorptive power is limited to about 20% by weight. In this connection, the element molybdenum is critical due to the formation of a separate phase.

Another problem is the volatilization of highly radioactive fission products during vitrification and especially of the nuclides Cs 137 and Ru 106. Cesium oxide volatilizes to an increasing degree at higher temperatures. The only effective countermeasure is the use of a vitrification temperature as low as possible.

In the waste solution, ruthenium is usually present in the third degree of oxidation. However, in the presence of oxidizing agents and at higher temperatures, it is easily oxidized to the eighth degree of oxidation. RuO$_4$ is obtained which melts at 25.4° C. and, due to its vapor pressure, infiltrates and significantly contaminates the waste gas.

Since the waste solution contains nitric acid and nitrates, the conditions for oxidation are met. RuO$_4$ is separated from the waste gas by means of filters containing iron oxide. A procedure frequently used to eliminate the conditions of oxidation is by decomposing (denitration) the nitric acid and nitrates by means of a reducing agent, such as, formaldehyde and formic acid. In this case, alkali nitrates and alkaline earth nitrates are usually not decomposed. However, when phosphoric acid is added, these salts are also subject to dehydration in a displacement reaction. However, the addition of phosphoric acid is practiced only when a phosphate glass is to be subsequently produced.

Thus far, liquid agents have been exclusively used in the denitration stage. Accordingly, the highly radioactive solutions are worked up with formaldehyde solution, sodium nitrate solution and phosphoric acid. Table 1 presents a balance of the solids and the water for a throughput of 200 m$^3$ of radioactive waste solution, with an operating time of 6000 hours per year:

TABLE 1

|   | Solids (kg/h) | Water (kg/h) |
|---|---|---|
| (a) Waste solution (= 200 m$^3$/a. = 33.3 l/h = approx. 40 kg/h (approx. 28%) | 11.2 | 28.8 |
| (b) Formaldehyde solution 30% 23.9 l/h = 26.3 kg/h | — | 16.7 |
| (c) Reaction water | — | 3.6 |
| (d) Sodium nitrate solution 30%. = 15.2 kg/h | 1.3 | 10.6 |

TABLE 1-continued

|  | Solids (kg/h) | Water (kg/h) |
|---|---|---|
| (e) Orthophosphoric acid 50%, = 10.4 l/h = 14.2 kg/h | 7.1 | 7.1 |
| Total 1 | 19.6 | 66.8 |
| Total 2 |  | 86.4 (22.7% by weight) |
| Concentration | 19.6 (40.0% by weight) | 29.4 |
| Evaporation | — | 37.7 |

The evaporated water (37.7 kg/h) represents an unwelcome volume of radioactive secondary waste in the system.

SUMMARY OF THE INVENTION

I have discovered a method for significantly decreasing the volume of secondary radioactive waste from such denitration processes. Specifically, this is accomplished by using reactants in the form of powders or gases in dosed amounts for the denitration.

With this procedure, numerous advantages in terms of elimination of secondary waste, and reduction of reaction times and production costs can be realized.

I have further discovered that the loss of the gaseous reactants, especially when paraformaldehyde is used, can be significantly decreased by conducting the discharge from the reacting vessel through an irrigation path containing Raschig rings or similar packing, and then through a reflux condenser.

DESCRIPTION OF THE PREFERRED EMBODIMENT

More particularly, in the present invention, paraformaldehyde, instead of the formaldehyde solution, and sodium biphosphate ($NaH_2PO_4$), instead of the sodium nitrate and the orthophosphoric acid solutions, are used. For continuous dosing, it is possible to use known dosing units with dosing throughputs of 300 g/h and up and a continuous manner of operation with a maximum deviation of less than ±0.5% of the adjusted nominal value, as measured over one minute.

Table 2 shows the balance of the solids and the water for a throughput of 200 m³ radioactive solution, with an operating time of 6000 hours per year:

TABLE 2

|  |  | Solids (kg/h) | Water (kg/h) |
|---|---|---|---|
| (a) | Waste solution | 11.2 | 28.8 |
| (b) | Paraformaldehyde | — | 3.2 |
| (c) | $NaH_2PO_4$, 51.6 t/a | 8.6 | — |
|  | Total 1 | 19.8 | 32.0 |
|  | Total 2 |  | 51.8 (38.0% by weight) |
|  | Evaporation | 49.5 (40.0% by weight) | 2.3 |

Water of crystallization and moisture in solids have not been considered (sodium biphosphate is the only sodium salt which has only 1 mol water of crystallization per mol of salt).

It can be seen that by a dosed addition of solids with the second manner of operation, practically the same result is obtained as in the evaporation with the first manner of operation. However, by using the second process according to the invention, the following advantageous results are obtained:

1. Reduction or even elimination of radioactive secondary wastes: (32.0−2.3)0.6000=178 200 kg/a=178.2 t/a. The reduction is approximately 92.8%. The complete elimination takes place in the next process step with a changed manner of operation.

2. Nitric acid of approximately 50% by weight which is ready for use can be recovered for dissolving the burnt fuel elements.

3. It is estimated that the denitration time can be cut in half or that the output of an existing denitration plant can be doubled.

4. A reduction of the production costs is obtained (vapor, cooling water, use of labor, etc.).

As further noted, significant decreases in the loss of gaseous reactants and more complete conversion of the reactants can be achieved by conducting the discharge from the vessel through an irrigation path and then through a reflux condenser.

By using such an irrigation path, the completeness of conversion, i.e., the destruction of nitrates with paraformaldehyde, can be increased from 75 to 80% to up to 85% and more. Simultaneously, the yield in paraformaldehyde, i.e., the percentage of the chemically reacted paraformaldehyde, increases from approximately 45% to up to 80% and more.

The intensity of the irrigation by means of the vapors which were discharged from the reaction vessel and, subsequently, condensated in the reflux condenser, advantageously is approximately 10 to 12.5 m³/h of condensate for each square meter of irrigation surface.

An even further acceleration and completion of the process can be obtained in this connection by the use of at least 0.25%, preferably 0.35 to 0.50%, potassium bisulfate relative to the amount of nitrate to be destroyed. As a result, a displacement reaction takes place in the denitration system which, on the one hand, displaces the free nitric acid from the nitrates and, on the other hand, hydrolizes the double cation compound to form the original salt. In this manner, the potassium bisulfate acting as the catalyst is restored.

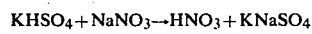

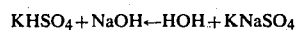

Finally, the powdery reaction material can be introduced in the form of a paraformaldehyde suspension, wherein the waste solution taken from the reaction vessel and cooled down, preferably to 40° to 60° C., serves as a suspension medium. Stable suspensions with 30 to 35% by weight paraformaldehyde can be easily produced and can be returned into the reaction vessel by means of air lifts or pumps.

The following numerical examples shall serve to further illustrate the invention:

EXAMPLE 1

1440 g sodium nitrate ($NaNO_3$) were dissolved in 2160 g desalted water. This solution was heated to 105° C. and then treated for approximately 10 hours with 450 g of pneumatically introduced paraformaldehyde. In this process, the denitration was 79.5% and the yield in paraformaldehyde was approximately 45%.

EXAMPLE 2

The procedure was the same as in Example 1, however, between the gas outlet of the reaction vessel and the reflux condenser, an irrigation path in the form of a glass tube which was filled with glass rings of 5 mm diameter was arranged. Only 300 g paraformaldehyde were used, while the remaining conditions were the same as in Example 1. An intensive flow of condensate from the vapors discharged from the reaction vessel was admitted to the irrigation path, namely, 10 to 12.5 m³/h of condensate for each square meter of irrigation surface. This resulted in a denitration of 95.8% and a paraformaldehyde yield of 81%.

EXAMPLE 3

Another test was carried out in accordance with Example 2. However 7.5 g of potassium bisulfate (KHSO₄) was added to the waste solution to be treated. In this case, despite a reduction in reaction time to 6.5 hours, an almost total denitration of 99.6% and an even higher yield in paraformaldehyde of 85.4% were obtained.

What is claimed is:

1. In a process for the denitration of highly radioactive waste solutions by reacting the solution with a reducing agent, the improvement which comprises carrying out the reaction with paraformaldehyde as the reducing agent.

2. The process of claim 1 wherein the reducing agent is added at a rate greater than about 300 grams per hour.

3. The process of claim 1 or 2, wherein gaseous discharge from the reaction is introduced into a trickling path and then into a reflux condenser.

4. The process of claim 1 or 2, wherein gaseous discharge from the reaction is introduced into a trickling path and then into a reflux condenser wherein about 10 to 12.5 m³/h of condensate are formed for each square meter of path surface.

5. The process of claim 1 or 2, wherein paraformaldehyde is used in the form of a powder and wherein the waste solution taken from the reaction is cooled to about 40° to 60° C., a suspension of the paraformaldehyde is formed in the cooled waste solution to form a suspension composed of from about 30 to 35% by weight of the paraformaldehyde, and this suspension is introduced to the reaction.

\* \* \* \* \*